July 31, 1945.  C. LORBER  2,380,657
SELF QUIZ TEST DEVICE
Filed March 31, 1944
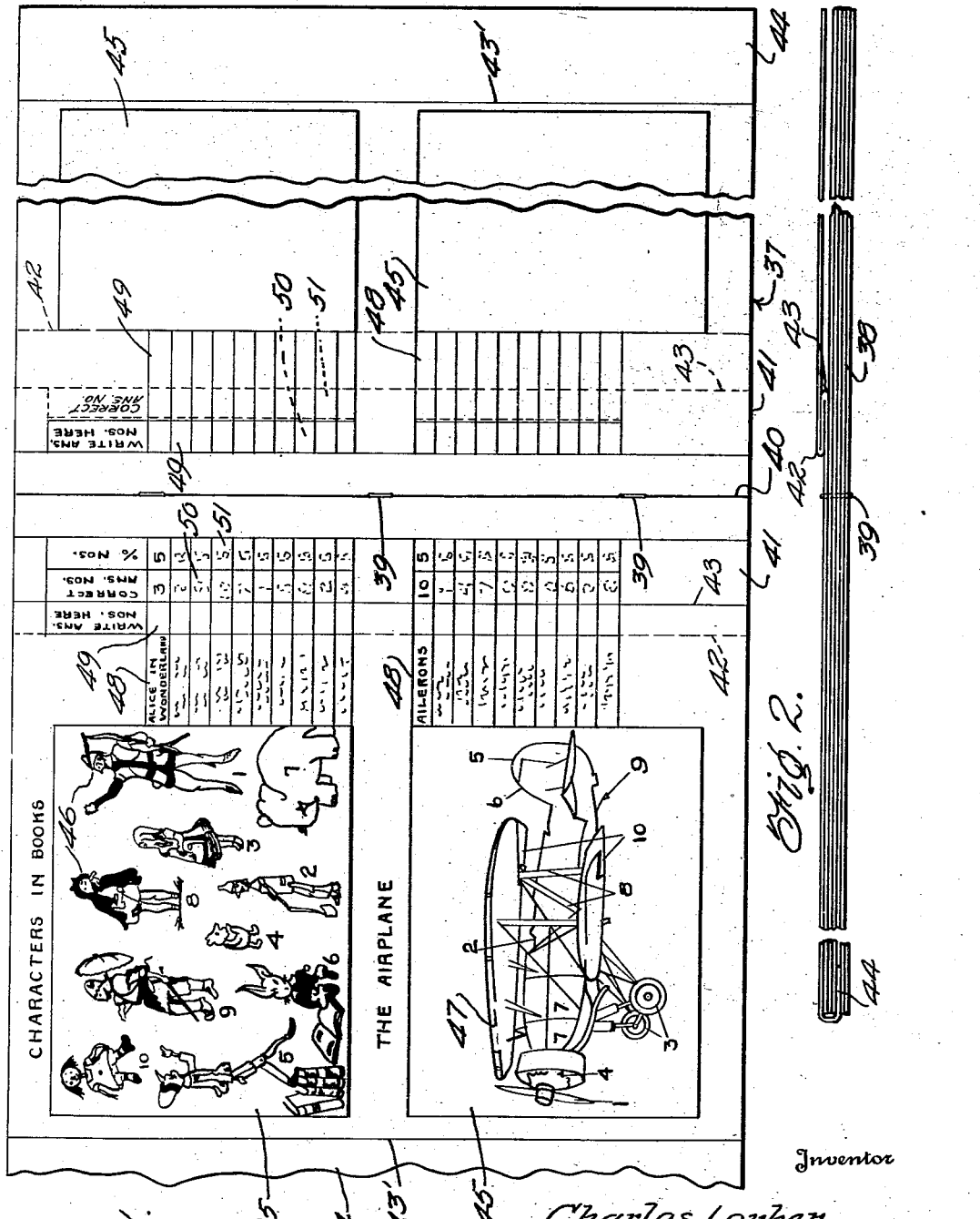
Inventor
Charles Lorber,
By 
Attorney Patented July 31, 1945

2,380,657

UNITED STATES PATENT OFFICE 2,380,657

SELF-QUIZ TEST DEVICE

Charles Lorber, Louisville, Ky.

Application March 31, 1944, Serial No. 528,996

2 Claims. (Cl. 35—48)

This invention relates to educational appliances and has special reference to devices whereby an individual may test his own knowledge.

More particularly the invention relates to a knowledge test device incorporated in a magazine or arranged in magazine form.

It is very common at the present time to have in popular magazines a series of questions or other problems for a person to answer. Such questions or problems are arranged on one page and the correct answers thereto are given on a page which is generally further toward the back of the magazine. Thus the user, after having given what he believes to be the correct answers to the questions or problems will have to turn over and hunt the correct answers in order to decide how many or what percentage of the answers he has given are correct. This of course is a very inconvenient method of determining such correct and incorrect answers.

The principal object of the present invention is to provide a magazine-like structure wherein at least one sheet in the bound-together sheets of the magazine will contain certain problems requiring answers and on the same sheet will be given the correct answers or indications of the correct answers, such correct answers or indications thereof being either normally folded under the edge of the sheet containing the problems or so arranged that before the answers are given the user may fold the correct answers under.

Another important object of the invention is to provide, on the portion of such a sheet as carries the problems a column of spaces wherein the user's answer or a key character indicating such answer may be inserted.

The third important object of the invention is to provide alongside of the correct answers on such a sheet a column of percentage values so that by checking those values in which the answer given corresponds to the true answer a percentage value for the person's knowledge may be quickly obtained.

With the above and other objects in view, as will be hereinafter apparent, the invention consists in general of certain novel features of construction and combinations of parts hereinafter fully described, illustrated in the accompanying drawing and particularly claimed.

In the accompanying drawing, like characters of references indicate like parts in the several views; and Fig. 1 is a face view of a sheet constructed in accordance with this invention.

Fig. 2 is a bottom edge view of the device shown in Fig. 1.

It is to be understood in what follows that the word "problem" as hereinafter used refers to any proposed task which may require an answer, such answer being either given entirely in the language of the user of the device or being given by the selection of one of a plurality of indexed answers associated with the particular problem to be solved, the answer being set down by writing the index of the answers selected from the particular plurality of answers.

In the form of the invention shown in Figs. 1 and 2 there is provided a sheet 37 secured centrally of its width to a series of other sheets 38 to a series of binding means 39. Adjacent the center of the sheet 37 and at each side of the binding line 40 the sheet is normally pleated as at 41 on fold lines 42 and 43. Adjacent each edge of the sheet 37 is a fold line 43'. When this pleat portion of a page is unfolded by pulling laterally one edge of the sheet there will be provided a portion 44 which overhangs the corresponding edges of the sheets 38 and may be used as a book mark or to contain printed matter. As an illustration of the problems which may be used in this form of the invention each leaf contains one or more rectangular spaces 45 and as herein shown such a space may contain a series of numbered pictures 46 of characters taken from books or may contain a picture such as 47 of some mechanical structure such as an aeroplane having its different parts numbered. At the inner edge of each space 45 is here shown a printed column of spaces 48 containing the names of the figures shown or of the parts shown and alongside of this column is a column of blank spaces 49 with the usual heading for such blank spaces, the column 49 abutting the fold line 43. Between the fold lines 43 and 42 is the usual column 50 of correct answers and column 51 of percentage values. While the spaces 45 on the right hand sheet of Fig. 1 are shown as blank it is understood that these spaces are to be likewise provided with printed matter of desired character and it is to be noted that the book characters from children's books and the aeroplane outline shown are merely illustrative of any desired problems. In this case the number of the book character or the aeroplane part as thought correct by the user is put in the appropriate blank space while the pleats are folded to hide the correct numbers and percentage values. Then upon unfolding the sheet as shown at the left of Fig. 1 comparison may be made and the percentage checked.

It is obvious that many minor changes may be made in the form and construction of the device as herein described and illustrated. It is not therefore desired to confine the invention to the exact form herein shown and described but it is desired to include all such as properly come within the scope claimed.

What is claimed is:

1. In a magazine-like structure having a series of sheets constituting the body of the structure, a supplemental sheet inserted at the cener of the series of sheets and bound therewith along its center line, said supplemental sheet having two pages of equal width each formed with a pleat adjacent the center line of the supplemental sheet and when unfolded being wider than the pages of the body, whereby, when unfolded the lateral edge portions of the supplemental sheet may be folded under and inserted between selected sheets of the series of sheets at their lateral edges, said pleats being each defined by a pair of parallel fold lines and the lateral edge portions being defined from the remainder of the sheet by fold lines, said major section bearing printed matter constituting a series of problems for testing a user's knowledge and having an associated column of blank spaces for insertion of assumedly correct answers to said problems, said supplemental sheet also having a corresponding column of indications of true answers to said problems, said last column being associated with the pleated portion of the sheet and being hidden when the pleat is in folded position.

2. In a magazine-like structure, a series of sheets constituting the body of the structure, and a supplemental sheet having a major section and a minor section normally folded under the major section and defined from each other by a fold line, said major section having a pleated portion defined by a pair of parallel fold lines, said major section upon unfolding of the pleated portion being of sufficient width to extend beyond the lateral edges of the series of sheets whereby the minor section may be inserted between any adjacent pair of the series of sheets to constitute a book mark, said major section bearing printed matter constituting a series of problems for testing a user's knowledge and having an associated column of blank spaces for insertion of assumedly correct answers to said problems said supplemental sheet also having a corresponding column of indications of true answers to said problems, said last column being associated with the pleated portion of the sheet and being hidden when the pleat is in folded position.

CHARLES LORBER.